(12) United States Patent
Krenz et al.

(10) Patent No.: US 11,912,431 B2
(45) Date of Patent: Feb. 27, 2024

(54) TIME BASED OVERLAY FOR POSITIONAL MAP DISPLAYS

(71) Applicant: Rockwell Collins, Inc., Cedar Rapids, IA (US)

(72) Inventors: Michael J. Krenz, Roscoe, IL (US); Ellen L McGaughy, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2 days.

(21) Appl. No.: 17/479,830

(22) Filed: Sep. 20, 2021

(65) Prior Publication Data

US 2023/0093761 A1 Mar. 23, 2023

(51) Int. Cl.

| G06F 3/048 | (2013.01) |
|---|---|
| B64D 43/02 | (2006.01) |
| G06F 3/04812 | (2022.01) |
| G06F 3/04847 | (2022.01) |
| G06F 3/0487 | (2013.01) |
| G06T 11/00 | (2006.01) |
| G08G 5/00 | (2006.01) |

(52) U.S. Cl.
CPC ........... *B64D 43/02* (2013.01); *G06F 3/0487* (2013.01); *G06F 3/04812* (2013.01); *G06F 3/04847* (2013.01); *G06T 11/00* (2013.01); *G08G 5/0021* (2013.01); *G08G 5/0052* (2013.01)

(58) Field of Classification Search
None
See application file for complete search history.

(56) References Cited

U.S. PATENT DOCUMENTS

| 7,765,061 | B1 | 7/2010 | Barber et al. |
|---|---|---|---|
| 8,099,201 | B1 | 1/2012 | Barber et al. |
| 9,593,961 | B2 | 3/2017 | Ramaiah et al. |
| 9,939,271 | B1 * | 4/2018 | Foster ................. G06F 3/04845 |
| 2009/0314880 | A1 | 12/2009 | Rawdon et al. |

(Continued)

FOREIGN PATENT DOCUMENTS

| EP | 1462897 A2 | 9/2004 |
|---|---|---|
| EP | 2778618 A2 | 9/2014 |

(Continued)

OTHER PUBLICATIONS

Extended European Search Report dated Feb. 15, 2023; European Application No. 22196402.6.

*Primary Examiner* — William C Trapanese
(74) *Attorney, Agent, or Firm* — Suiter Swantz pc llo

(57) ABSTRACT

A system and method for displaying dynamic time-based ranging over a moving map determines position, heading, and airspeed information of an ownship. Based on the positioning information of the ownship, the moving map projects the ownship forward in time and superimposes on the moving map (which may already include distance-based ranging information) time-based ranging information indicating a projected range of positions of the ownship at future or subsequent times relative to the current time. The displayed time-based ranging indicators may be arcuate in shape but adjusted to account for dynamic factors such as headwinds or tailwinds that may affect the time required for the ownship to reach a target at a given distance.

14 Claims, 9 Drawing Sheets

(56) References Cited

U.S. PATENT DOCUMENTS

| | | | |
|---|---|---|---|
| 2012/0209457 | A1 | 8/2012 | Bushnell |
| 2013/0204523 | A1 | 8/2013 | He et al. |
| 2015/0355832 | A1* | 12/2015 | Dostal .................... G08G 5/006 |
| | | | 715/771 |
| 2016/0232797 | A1 | 8/2016 | Wiesemann et al. |
| 2019/0371183 | A1* | 12/2019 | Mecklem ............. G08G 5/0078 |
| 2020/0111375 | A1* | 4/2020 | Garden ................ G08G 5/0082 |
| 2021/0276728 | A1* | 9/2021 | Mast ...................... B64D 45/00 |

FOREIGN PATENT DOCUMENTS

| | | |
|---|---|---|
| EP | 2837914 A1 | 2/2015 |
| EP | 3355146 B1 | 2/2019 |
| WO | 2011120939 A3 | 11/2011 |
| WO | 2012080453 A1 | 6/2012 |
| WO | 2016086278 A1 | 6/2016 |

* cited by examiner

TIME BASED OVERLAY FOR POSITIONAL MAP DISPLAYS

BACKGROUND

Aircraft-based moving maps (e.g., navigational maps) are generally scaled in terms of distance, e.g., portraying an aircraft along with nearby air traffic, navigational aids, political boundaries, landmarks, natural features, etc. in terms of the distance from the aircraft to any of these proximate objects at a given time. However, at many points or during many segments inflight, time-based positioning information may be more important scale than distance-based positioning. For example, when flying over bodies of water or inhospitable terrain, the actual flying time to the nearest airport may be more useful information than the air distance thereto. Similarly, when landing behind another aircraft, time and not distance determines the dissipation of wake vortices produced by the previously landing aircraft. Further, from the aircraft perspective the translation between distance and time is non-trivial, especially with respect to, e.g., wind patterns (which may vary according to the altitude over a coordinate point on a moving map) or relative velocities between aircraft on different vector headings). While time-based maps are in use (e.g., one-dimensional or two-dimensional time scales), conventional moving maps do not correlate distance-based and time-based positioning information.

SUMMARY

In a first aspect, a flight display system for providing time-based overlays on a positional map display is disclosed. In embodiments, the flight display system is in communication with controlling avionics (e.g., a flight management system (FMS), sensors, communications, positioning systems, and/or memory configured for storage of the aircraft flight plan) and includes a display unit (e.g., cockpit display unit, electronic flight bag (EFB) or other mobile device-based display) for providing a distance-based "moving map" centered on an ownship position of an aircraft at a current time. The moving map further includes a velocity vector of the aircraft (e.g., airspeed, heading) and objects (fixed and mobile) proximate to the aircraft, some of which objects may be time-displaced (e.g., air traffic moving relative to the ownship, fixed waypoints associated with predicted overflight times by the flight plan). In embodiments, the flight display system determines a time range of the ownship based on its velocity vector, the time range including possible positions of the ownship projected forward in the time domain by a subsequent time. In embodiments, the flight display system determines the relative velocities of any proximate air traffic and weather systems associated with position information as well as the predicted overflight times of time-displaced waypoints. In embodiments, the flight display system superimposes on the distance-based moving map time-based ranging indicators based on the determined time range of the ownship, as well as time-displacement vectors indicative of time-displaced contact of the ownship with time-displaced mobile and fixed objects.

In some embodiments, the time-domain range indicators including a first indicator or indicator set based on a set subsequent time and additional indicators based on a multiple of the subsequent time.

In some embodiments, the flight display system receives wind vectoring information indicative of wind speed and direction proximate to the aircraft or in its flight path. The flight display system adjusts the time-based ranging indicators to account for the variable time range of the aircraft with a tailwind and/or into a headwind.

In some embodiments, the flight display system includes manual controls for increasing or decreasing the subsequent time upon which time-based ranging indicators are based.

In some embodiments, the manual controls including rotatable controls (e.g., dials, trackballs) and/or buttons for adjusting the subsequent time.

In some embodiments, each time-displacement vector includes a terminator indicating a future contact of the ownship with the associated time-displaced object in the time domain.

In some embodiments, each time-displacement vector is orthogonal to the time-based ranging indicators.

In some embodiments, time-displaced objects include proximate mobile aircraft reporting position information, the position information received by the flight display system via traffic reports (e.g., TCAS, ADS-B, other traffic control/surveillance services) received by the controlling avionics.

In some embodiments, time-displaced objects include weather systems, and the flight display system receives via the controlling avionics weather reports indicative of the positions and/or relative velocities of the weather systems or elements thereof.

In some embodiments, time-displaced objects include ground-based waypoints associated with predicted overflight times provided to the flight display system via the aircraft flight plan.

In some embodiments, the flight display system includes a cursor adjustable to the pilot (e.g., via manual controls) and capable of highlighting time-displaced objects; the flight display system displays numeric time-based ranging information (e.g., time of imminent contact) associated with highlighted time-displaced objects.

In some embodiments, the subsequent time is associated with a time-domain proximity zone; the flight display system provides time-displacement vectors for any time-displaced objects whose time-displaced contacts with the aircraft lie inside the proximity zone.

In a further aspect, a method for providing time-based overlays for positional maps is also disclosed. In embodiments, the method includes providing, via an aircraft-based flight display system, a distance-based moving map indicative of a current position of the aircraft (e.g., ownship) at a current time, a velocity vector of the ownship, and time-displaced objects proximate to the ownship. Time-displaced objects include proximate aircraft moving relative to the ownship, and time-displaced waypoints or other fixed objects associated with predicted contact times (e.g., per the aircraft flight plan). The method includes determining a time range of the aircraft based on its velocity vector, the time range including possible positions of the aircraft projected forward in the time domain (e.g., according to a particular subsequent time, such as 5 minutes from the current time). The method includes determining relative velocities of any proximate aircraft as well as the predicted overflight times of any time-displaced waypoints or fixed objects. The method includes superimposing on the distance-based moving map 1) time-domain range indicators based on the time range of the ownship and 2) time-displacement vectors for each time-displaced object and based on the relative velocities or predicted overflight times thereof, each time-displacement vector indicative of a future time-displaced contact of the aircraft with the time-displaced object.

In some embodiments, the method includes receiving wind vector information indicative of wind speed and direction proximate to the aircraft or its direct flight path. The method includes adjusting the time-domain range indicators to account for variations in the time range of the aircraft when flying with a tailwind and/or into a headwind.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
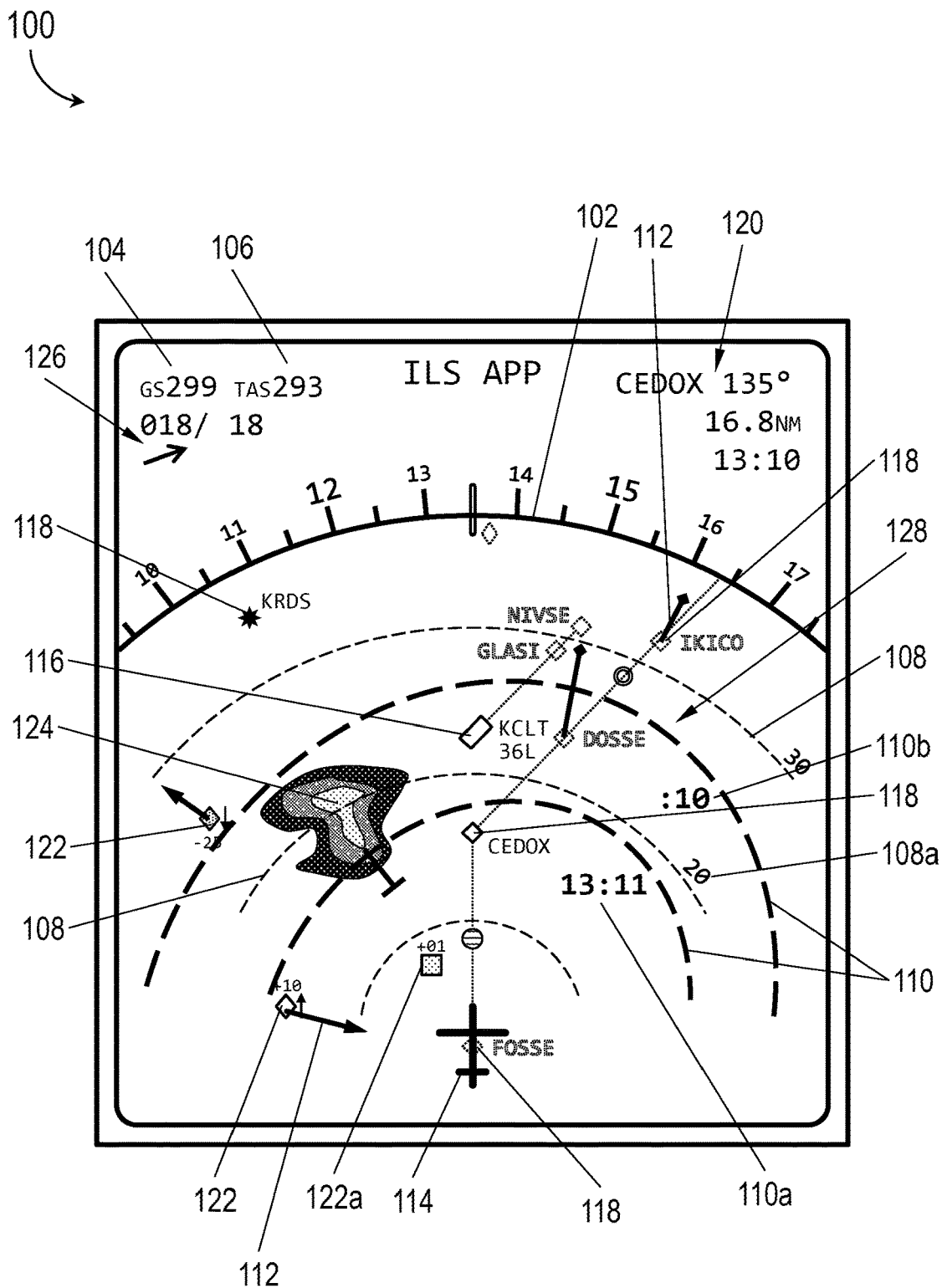
FIG. 1 is an illustration of a flight display system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for superimposing dynamic time-based ranging information on an aircraft-based moving map, e.g., correlated with distance-based ranging. In addition to distance ranging to waypoints, airports, and other fixed objects (and, e.g., distance-based spatial separation from air traffic and other moving objects), the moving map enhances situational awareness by providing accurate time-based ranging of fixed and moving objects in real time that accounts for wind patterns and other dynamic factors.

Referring to FIG. 1, a moving map 100 is disclosed. The moving map 100 may include compass indicator 102, groundspeed indicator 104, airspeed (e.g., true airspeed/indicated airspeed (TAS/IAS)) indicator 106, distance-based ranging 108, time-based ranging 110, and time-displacement vectors 112.

In embodiments, the moving map 100 may include, but is not limited to, a Traffic Collision Avoidance System (TCAS), Terrain Awareness Warning System (TAWS), Electronic Horizontal Situation Indicator (EHSI), and/or approach chart displayable via an electronic display unit, e.g., within the cockpit of an aircraft or other mobile platform or via electronic flight bag (EFB) equipment displayed via mobile computing/communications device. For example, the moving map 100 may include or may be compatible with other airborne collision avoidance and/or surveillance systems, e.g., Automatic Dependent Surveillance-Broadcast (ADS-B)).

In embodiments, the moving map 100 may be connected to controlling avionics of the embodying aircraft (e.g., ownship) and may thereby receive positioning data relevant to the ownship, e.g., the aircraft aboard which the moving map is embodied and/or for which the moving map is providing positioning information. For example, the moving map 100 may portray the ownship as a simulated aircraft 114, relative to which other fixed and mobile objects may shift position based on the vector heading of the ownship. In embodiments, controlling avionics may include positioning sensors onboard the ownship (e.g., absolute or relative positioning systems and/or altimeters) configured to continuously determine a position and altitude of the ownship.

Similarly, controlling avionics may determine the absolute positions of fixed objects such as airport runways 116 (e.g., KCLT, or Charlotte/Douglas International Airport) or radar navigation (RNAV) beacons and waypoints 118 (e.g., FOSSE, CEDOX, DOSSE, IKICO, NIVSE, GLAST, KRDS) and provide this information to graphics generation processors (GGP) such that the moving map 100 tracks and depicts these objects as the position of the ownship (e.g., simulated aircraft 114) changes relative to the positions of these objects. For example, the ownship may be on a heading to contact the CEDOX waypoint 118 (e.g., overfly the waypoint at a predetermined altitude or within a predetermined altitude range, as provided by the aircraft flight plan). The moving map 100 may include a course display 120, e.g., providing alphanumeric indication that the CEDOX waypoint 118 lies, relative to the ownship, at a heading of 135 degrees (i.e., the current ownship heading) and a distance of 16.8 nautical miles (NM) (~31.1 km), and that contact will occur at 13:10 local time based on the current airspeed (TAS 106).

In embodiments, the distance-based ranging 108 may depict relative distance in terms of circular arcs. The moving map 100 may provide distance-based ranging 108 as an overlay, superimposing concentric indicators of the approximate relative distance of all objects having a known position relative to the ownship. For example, the distance-based ranging 108 may overlay concentric arcs of 10, 20, and 30 NM (~18.5 km, 37.0 km, 55.6 km) to clearly indicate relative distance from the ownship, some or all of which arcuate indicators may be labeled (108a). The GLAST waypoint 118, for example, may lie just inside a 30 NM radius relative to the ownship, while the NIVSE waypoint may lie just outside the 30 NM radius.

In embodiments, the moving map 100 may further process positioning information received from the controlling avionics to generate time-based ranging 110 and/or time-displacement vectors 112 superimposed over the moving map, e.g., by graphics generation processors. For example, time-based ranging 110 may superimpose indicators of the projected position of the ownship at a subsequent time, e.g., based on the current position and velocity vector (e.g., heading, and airspeed) of the ownship. In embodiments, the precise number of time-based ranging indicators 110 displayed (e.g., one, two, three, or more) may be dependent on the currently selected subsequent times as well as the current range of the moving map 100. Additionally or alternatively, the precise number of time-based ranging indicators displayed may be selected by the pilot/operator. For example, the current subsequent time may be set to +5 minutes; accordingly, time-based ranging 110 may include an indicator corresponding to all possible positions of the ownship five minutes subsequent to the current time. In embodiments, time-based ranging 110 may include additional indicators corresponding to possible positions of the ownship at a multiple of the subsequent time (e.g., +10 minutes, or other integer or non-integer multiples), as space within the moving map 100 permits or as selected by the pilot or operator.

In embodiments, the subsequent time may be absolute or relative (e.g., to the current time). If, for example, the current local time aboard the ownship is 13:06, the moving map 100 may determine, based on a current ownship heading of 135° (per course display 120) and an airspeed of 293 NM/h ("knots") (TAS 106; ~542.6 km/h), all possible positions of the ownship+5 minutes and +10 minutes subsequent to the current time (e.g., 13:11, 13:16) and superimpose these possible positions as arcuate indicators as shown by FIG. 1. In embodiments, the arcuate indicators produced by time-based ranging 110 may be selectably colored and/or displayed (e.g., via broken lines of width, pattern, and/or color distinct from the distance-based ranging 108) and may be labeled accordingly. For example, labels may selectably indicate a subsequent time that is absolute (110a; 13:11, or 5 minutes after the current time, 13:06) or relative (110b; ":10"/"0:10", or 10 minutes subsequent to the current time (i.e., 13:16)). In embodiments, the moving map 100 may be set to provide any number of time-based ranging indicators 110 at any desired subsequent times or multiples thereof, as noted above. Time-based ranging indicators 110 may provide the pilot, at a glance, with approximate arrival times for airport runways 116 and waypoints 118 as well as proximate air traffic 122, weather systems 124, and other mobile objects proximate to the ownship.

In embodiments, the moving map 100 may additionally or alternatively provide time-displacement vectors 112 corresponding to 1) mobile objects (e.g., proximate aircraft 122, weather systems 124) for which relative velocity information can be determined; and/or 2) time-displaced fixed objects (e.g., the DOSSE and IKICO waypoints 118). (Time-displacement vectors 112 will be disclosed in greater detail below.)

In some embodiments, certain time-displaced objects, whether mobile or fixed-location, may not be associated with a time-displacement vector 112 (e.g., if no relative velocity can be determined or if a relative velocity is negligible or nonexistent). For example, the aircraft 122a may be close enough spatially to the ownship (simulated aircraft 114) to trigger a TCAS alert (e.g., the aircraft 122a is represented by the mobile map 100 as a red square, as opposed to other proximate aircraft 122 represented by diamond shapes). However, the heading and airspeed of the aircraft 122a may be sufficiently aligned with the velocity vector of the ownship for there to be negligible or no relative velocity between the two aircraft (and, accordingly, no imminent contact between the two aircraft due to their substantially parallel headings). Accordingly, the moving map 100 may not provide a time-displacement vector for the aircraft 122a.

In embodiments, time-based ranging 110 may differ from distance-based ranging 108 in that, for example, the arcuate indicators produced by time-based ranging may not correspond to precise circular arcs, but may instead be modified based on a variety of dynamic factors. For example, the moving map 100 may include a windspeed indicator 126 indicating as accurately as possible a wind speed and direction at or near the current position and altitude of the ownship or in its direct path (e.g., 18 NM/h in a roughly south-southwesterly direction). In embodiments, a wind vector indicating wind speed and direction may be derived from a wind speed and/or heading measured on the ground and received by the controlling avionics, or the wind speed may be calculated by the controlling avionics based on airspeed (106) and ground speed (104).

In embodiments, due to the influence of the wind upon the ownship, targets, destinations, and objects in a leeward direction relative to the ownship may be reached in a shorter time (e.g., with a tailwind) than corresponding targets at the same relative distance in a windward direction (e.g., into a headwind). Accordingly, in embodiments, the time-based ranging 110 may produce arcuate indicators skewed in the leeward direction (128) and indicative of the increased time range of the ownship when flying with a tailwind rather than into a headwind. In some embodiments, the calculation of time-based ranging 110 and/or time-displacement vectors 112 may account for variations in wind speed and/or direction at different altitudes corresponding to a geographical location (e.g., latitude and longitude).

Figures 2A, 2B:
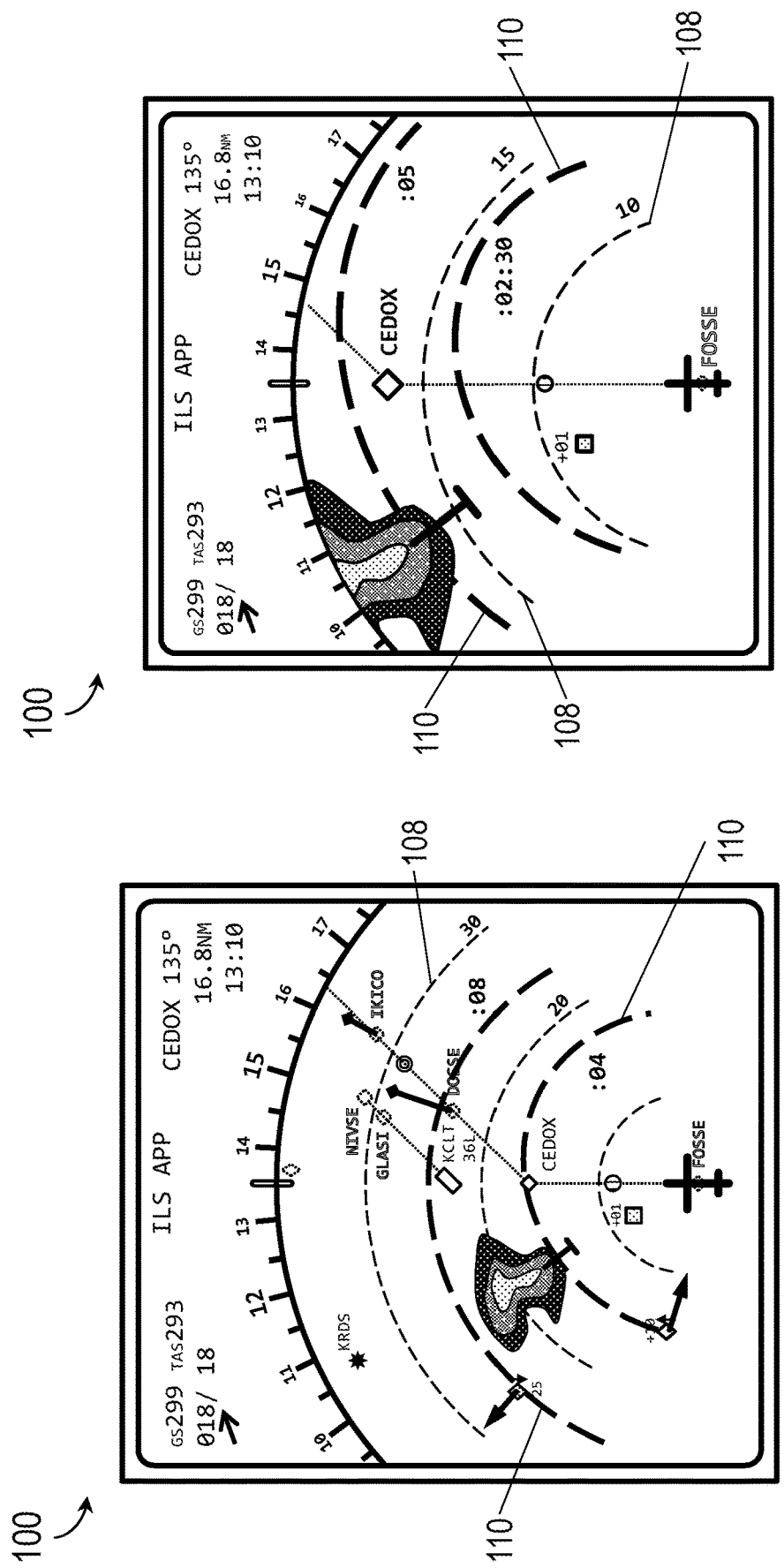
FIGS. 2A and 2B are illustration of the flight display system of FIG. 1 showing scaling operations.

Referring also to FIGS. 2A and 2B, the moving map 100 is shown.

In embodiments, time-based ranging 110 may be scaled up or down to select larger or smaller subsequent times relative to the current time. For example, the moving map 100 of FIG. 1 depicts time-based ranging indicators 110 at +5 minutes and +10 minutes relative to the current time. The moving map 100 of FIG. 2A, however, may depict time-based indicators 110 at +4 minutes and +8 minutes relative to the current time while maintaining scale with respect to the moving map, reflecting a change in subsequent time from +5 minutes to +4 minutes (note that distance-based ranging indicators 108 remain at 10 NM, 20 NM, and 30 NM, comparable with the moving map 100 of FIG. 1). In some embodiments, referring to FIG. 2B, the distance-based scale of the moving map 100 may be adjusted, and the time-based ranging indicators 110 may automatically adjust in response to a corresponding scaling up or down of the subsequent time. For example, the moving map 100 of FIG. 2B may scale down to a fraction of the area shown by the moving map 100 of FIG. 1 (note the distance-based ranging indicators 108 at 10 NM and 215 NM), and the time-based ranging indicators 110 may scale down to +2.5 minutes (2:30) and +5 minutes (: 05), e.g., to represent a 50% scaling down of the subsequent time.

Figure 3:
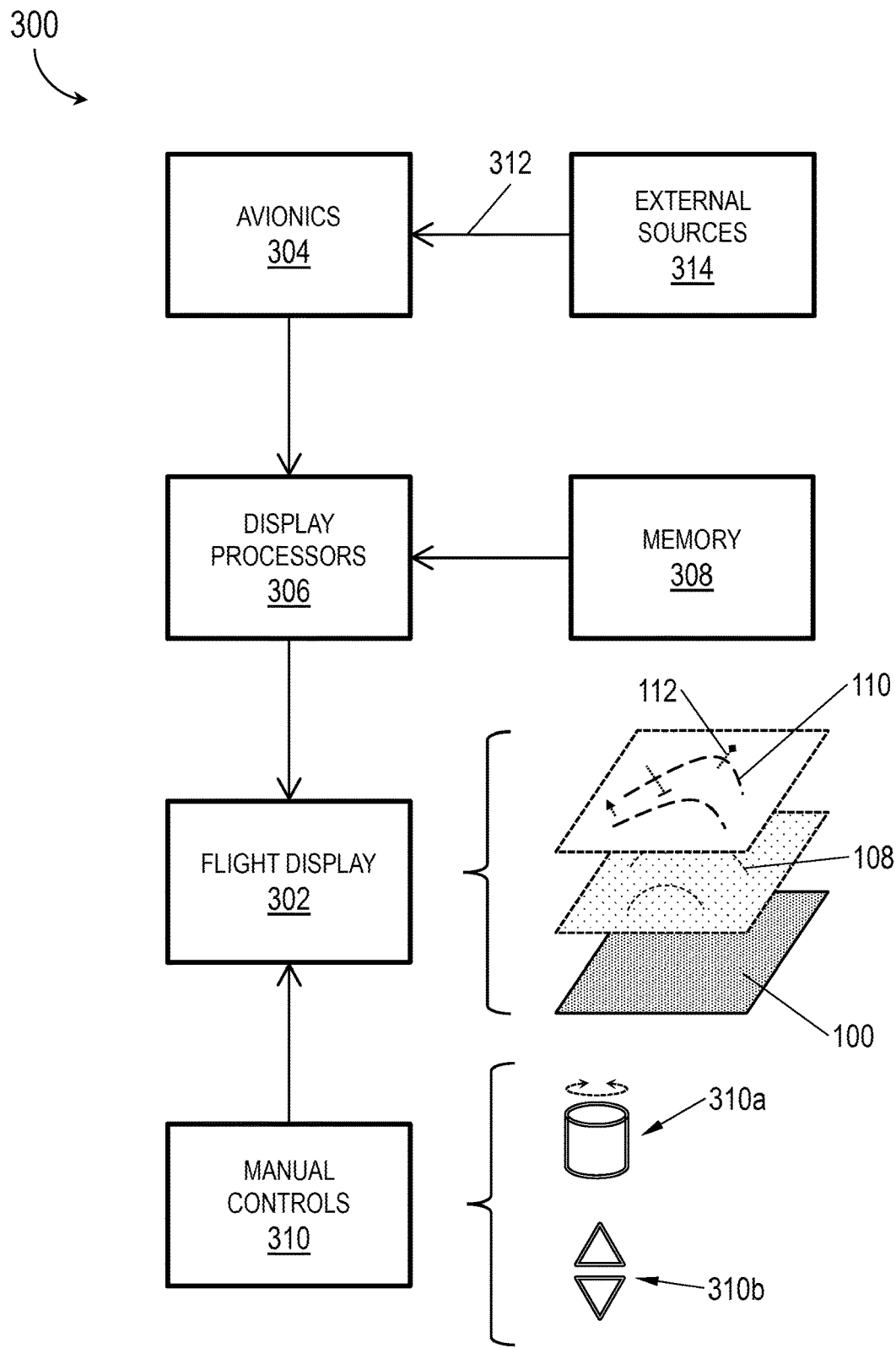
FIG. 3 is a block diagram of the flight display system of FIG. 1.

Referring now to FIG. 3, an aircraft 300 is shown. The aircraft 300 may include flight display system 302, controlling avionics 304, display processors 306 (e.g., graphics generation processors), memory 308, and manual controls 310.

In embodiments, the moving map 100 may be provided by a flight display system 302 aboard the aircraft 300 (e.g., ownship). Alternatively, in some embodiments the flight display system 302 may be embodied remotely from the aircraft 300 (e.g., in a ground-based control facility) but driven by ownship positioning information corresponding to the aircraft 300 (and air traffic data, terrain data, etc. proximate to the position of the aircraft 300), so as to provide enhanced situational awareness to a remote pilot in control (RPIC) of the aircraft.

In embodiments, controlling avionics 304 of the aircraft 300 monitor the position of the aircraft 300, e.g., via absolute positioning systems (e.g., satellite-based navigational receivers) and/or relative positioning systems (e.g., inertial measurement units (IMU)) and provide updated positioning information to the display processors 306 (e.g., graphics generation processors). Further, the controlling avionics 304 monitor traffic reports 312 received by the aircraft 300 from external sources 314. For example, external sources 314 may include proximate aircraft reporting position information (periodically (e.g., via ADS-B Out broadcasts to ground control and any proximate aircraft (120, FIG. 1)) capable of receiving them) and/or in response to transponder interrogations e.g., (via TCAS, Traffic Information Service-Broadcast (TIS-B), and/or other traffic control or surveillance services). In embodiments, external sources 314 may additionally include weather radar services (e.g., Flight Information Service-Broadcast (FIS-B)) and/or ground control transmissions including wind vector information (windspeed indicator 126, FIG. 1) and/or the likely position, heading, and speed of weather systems (124, FIG. 1).

In embodiments, display processors 306 may receive, in addition to positioning information from the controlling avionics 304, terrain data and other data relevant to ground control facilities, airport runways (116, FIG. 1), waypoints (118, FIG. 1) and other ground-based fixed objects from memory 308, e.g., via lookup tables. For example, the display processors 306 may use this information to generate, via the flight display system 302, the moving map 100 including distance-based ranging 108.

In embodiments, the display processors 306 may further process position, heading, and airspeed data of the aircraft 300 (ownship) received from the controlling avionics 304 to project the position of the aircraft forward in time, e.g., relative to underlying terrain, weather systems 124, fixed objects (e.g., waypoints 118), and time-displaced mobile objects whose positions are known to the controlling avionics. For example, the display processors 306 may generate time-based ranging indicators 110 and/or time-displacement vectors 112 (which may be affected by wind speed and direction or other dynamic factors) for superposition by the flight display system 302 over the moving map 100 and distance-based ranging indicators 108.

In embodiments, the pilot or operator of the aircraft 300 may activate, deactivate, or adjust the time-based ranging indicators 110 via control input provided through controls 310. For example, controls 310 may include a rotatable dial 310a or trackball, e.g., configured for increasing or decreasing the subsequent times to which the time-based ranging indicators 110 correspond (as shown by FIG. 2A above). Similarly, the controls 310 may include buttons 310b for increasing or decreasing the corresponding subsequent times.

Figure 4A:
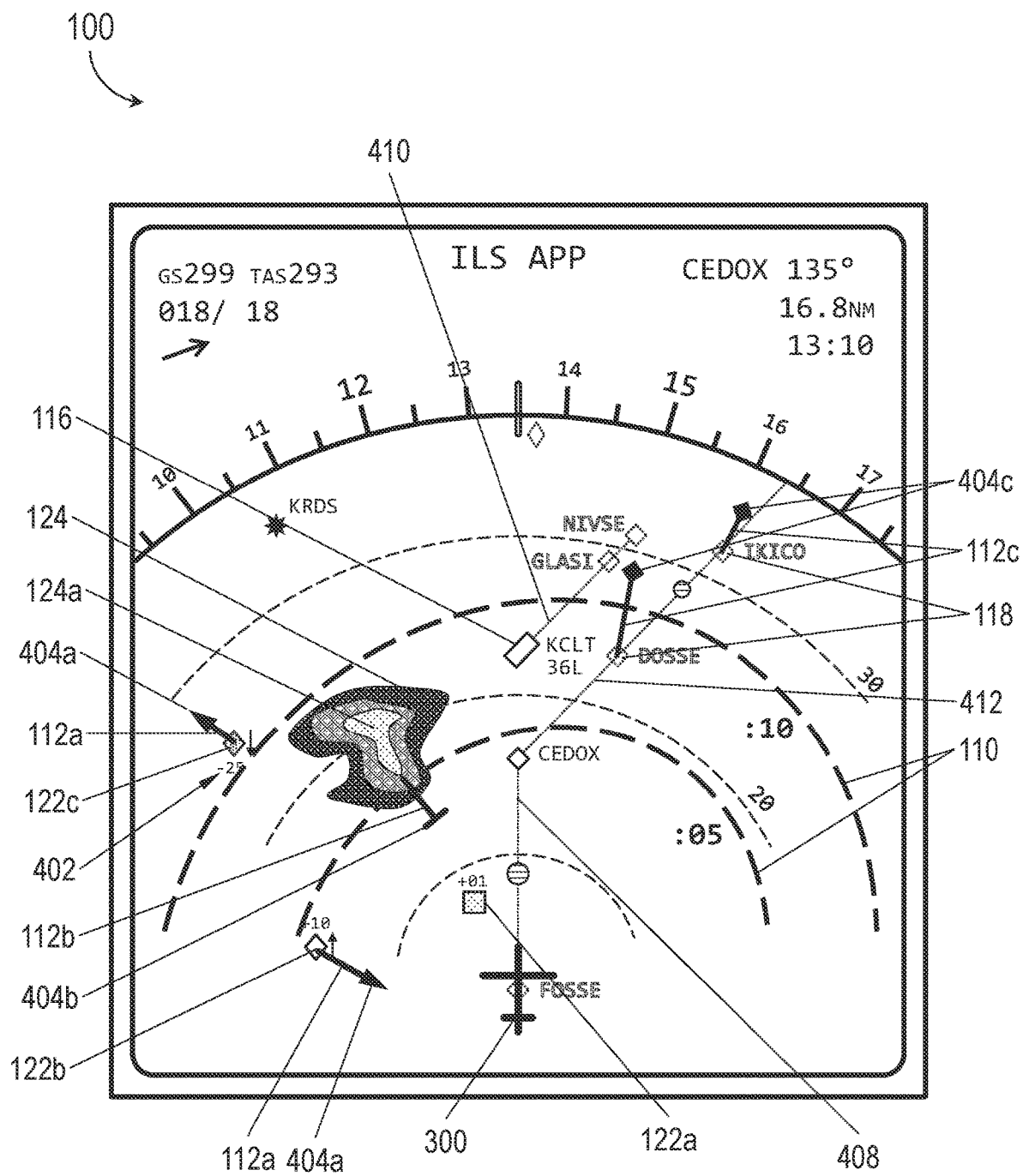
FIG. 4A is an illustration of the flight display system of FIG. 1 showing time-displacement vectoring operations.

Referring now to FIG. 4A, the moving map 100 is shown.

In embodiments, time-based ranging indicators 110 may include time-displacement vectors 112a-c indicating future contacts of the aircraft 300 of mobile objects proximate to the ownship in the time domain. For example, time-displacement vectors 112a-c may be colored (e.g., dashed, styled) similarly to the time-based ranging indicators 110 in order to rapidly and clearly distinguish both as time-domain information. For example, proximate air traffic 122 may include aircraft 122a-c currently within a 30 NM radius of the aircraft 300. As previously noted, the aircraft 122a may have a velocity vector sufficiently aligned with that of the aircraft 300 (e.g., similar airspeeds, parallel headings) for there to be negligible or no relative velocity between the two aircraft (and no likely future contact), and thus no time-displacement vector may be associated with the aircraft 122a. Each aircraft 122b-c may follow a distinct velocity vector (e.g., heading and airspeed) and may continually report its position, e.g., via TCAS, ADS-B, and/or other like collision avoidance or surveillance services accessible to the controlling avionics (304, FIG. 3). Based on information reported by each aircraft 122a-c (e.g., aircraft identifiers, airspeeds, positions, altitudes (e.g., relative altitude indicators 402, headings), the display processors (306, FIG. 3) may monitor relative velocities of each aircraft 122a-c relative to the aircraft sources 314 300 and project each aircraft forward in the time domain.

Figure 4B:
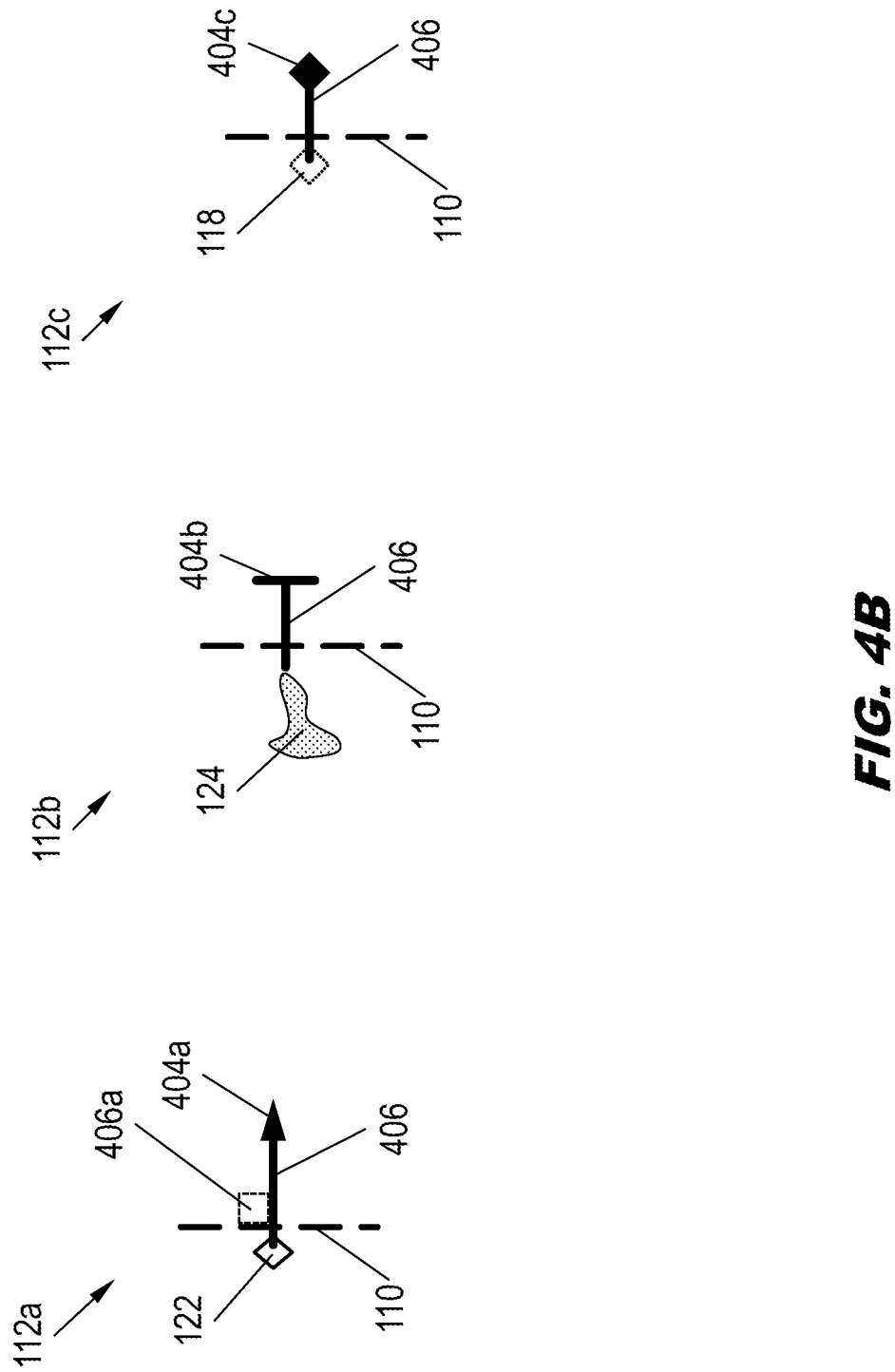
FIG. 4B illustrates time-displacement vectors generated by the flight display system of FIG. 1 pursuant to the time-displacement vectoring operations of FIG. 4A.

Accordingly, referring also to FIG. 4B, in embodiments each time-displacement vector 112a-c may include a terminator 404a-c corresponding to a time-displaced contact (e.g., a contact of the ownship and the time-displaced object) associated with the time-displacement vector. For example, terminators 404a-c may serve to indicate a future point in time (e.g., relative to the time-based ranging indicators 110) where the aircraft 300 may contact (e.g., overfly, collide with, meet) a time-displaced object given the current velocity vector of the ownship (and, if the time-displaced object is a mobile aircraft 122 or weather system 124, the current velocity vector of the mobile object).

In embodiments, terminators 404a-c presented by the moving map 100 may allow the pilot to clearly distinguish between different types of time-displaced objects. For example, terminators 404a of time-displacement vectors 112a corresponding to proximate aircraft 122 may include arrowheads, the tips of which may correspond to a time-displaced contact between the aircraft 300 and the proximate aircraft. Similarly, terminators 404b of time-displacement vectors 112b corresponding to weather systems 124 (e.g., to core elements (124a, FIG. 4A) of the weather system that may be associated with sufficiently strong winds or other atmospheric conditions as to present a potential hazard to the aircraft 300, and which the ownship may modify its flight plan to evade) may include orthogonal line segments or other like broad terminators indicative of, e.g., a weather front of considerable breadth or of a degree of uncertainty or volatility associated with the core element (or with the weather system generally). In embodiments, terminators 404c of time-displacement vectors 112c associated with time-displaced fixed objects (e.g., waypoints 118) may include diamonds, rhomboids, circles, or other indicators of a time-displaced fixed object as opposed to a mobile object (e.g., symbology similar to that representing the time-displaced fixed object on the mobile map 100).

In embodiments, each time-displacement vector 112a-c may include a vector shaft 406 connecting the respective terminator 404a-c to the corresponding time-displaced object (aircraft 122, weather system 124, waypoint 118). For example, vector shafts 406 may be presented by the mobile map 100 as not only similarly colored and styled to, but orthogonal to (406a) the time-based ranging indicators 110, in order to emphasize that the time-displacement vectors 112a-c correspond not to physical orientations or positions of the respective time-displaced objects, but to time-displaced contacts of each time-displaced object with the aircraft 300 in the time domain (e.g., relative to the indicated time ranges, and accounting for wind vectors and/or other dynamic factors). For example, referring back to FIG. 4A, the time-displacement vector 112 associated with the aircraft 122b may indicate contact with the aircraft 300 in 2-3 minutes given the relative velocities of the aircraft 122b, 300. Similarly, the time-displacement vector 112 associated with the aircraft 122c may indicate contact in 11-12 minutes given the relative velocities of the aircraft 122c, 300, and the time-displacement vector 112 associated with the core element 124a of the weather system 124 may indicate contact by the aircraft 300 with the core element in 3-4 minutes.

In embodiments, the time-displacement vectors 112 associated with the DOSSE and IKICO waypoints 118 reflect that these waypoints may be included within the flight plan of the aircraft 300. For example, the flight plan of the aircraft 300 may provide for predicted arrival times (e.g., predicted times for overflight of the DOSSE and IKICO waypoints 118 respectively), and the display processors 306 may receive these predicted arrival times and other flight plan information from the controlling avionics 302. However, the DOSSE and IKICO waypoints 118 may be time-displaced objects in that these waypoints are not (or at least not currently) directly in the current flight path 408 of the aircraft 300. Accordingly, the physical distance between the aircraft 300 and these waypoints 118 is less significant than an indication of future overflight in the time domain. For example, as shown by the moving map 100, the aircraft 300 may be on course to overfly the CEDOX waypoint 118 in approximately 4 minutes (e.g., 13:10), at which time the aircraft will change heading and overfly the DOSSE and IKICO waypoints before changing heading once more to overfly the NIVSE and GLASI waypoints on its approach path 410 to land at KCLT runway 36 L (116). It can also be seen that the physical distances of the DOSSE and IKICO waypoints from the aircraft 300 are approximately 24 NM and 32 NM respectively. However, as the aircraft 300 is not directly flying to either waypoint 118 (but instead overflying via the CEDOX waypoint), the time-displacement vectors 112 (and their respective terminators 404) associated with each waypoint do not align with the physical distances to each waypoint. In embodiments, the time-displacement vectors 112 may instead indicate time-displaced contact of the ownship with the DOSSE and IKICO waypoints 118 (e.g., overflight of each waypoint) within approximately 11-12 and 15-17 minutes of the current time respectively. For example, as the aircraft 300 nears the CEDOX waypoint 118, the time-displacement vectors 112 associated with the DOSSE and IKICO waypoints may shrink in size until the ownship reaches the CEDOX waypoint. When the aircraft 300 makes contact with the CEDOX waypoint 118 and changes heading, the DOSSE and IKICO waypoints may be in the direct flight path (412) of the ownship and may therefore no longer be time-displaced objects (as the overflight time for each waypoint may be a product of the velocity vector of the aircraft 300 and the physical distance of each waypoint). Accordingly, the moving map 100 may discontinue presentation of time-displacement vectors 112 associated with the DOSSE and IKICO waypoints 118.

Further, it may be noted that while the NIVSE and GLASI waypoints 118 may also be on the approach path 410 to the KCLT runway 36 L (116), the approach path 410 may not yet be synchronized with the flight paths 408, 412. Accordingly, no predicted times of arrival may currently be associated with the NIVSE and GLASI waypoints 118 (or the predicted times of arrival may be outside a useful time range of the moving map 100), and no time-displacement vectors 112 may currently be associated with the NIVSE and GLASI waypoints.

Figure 5:
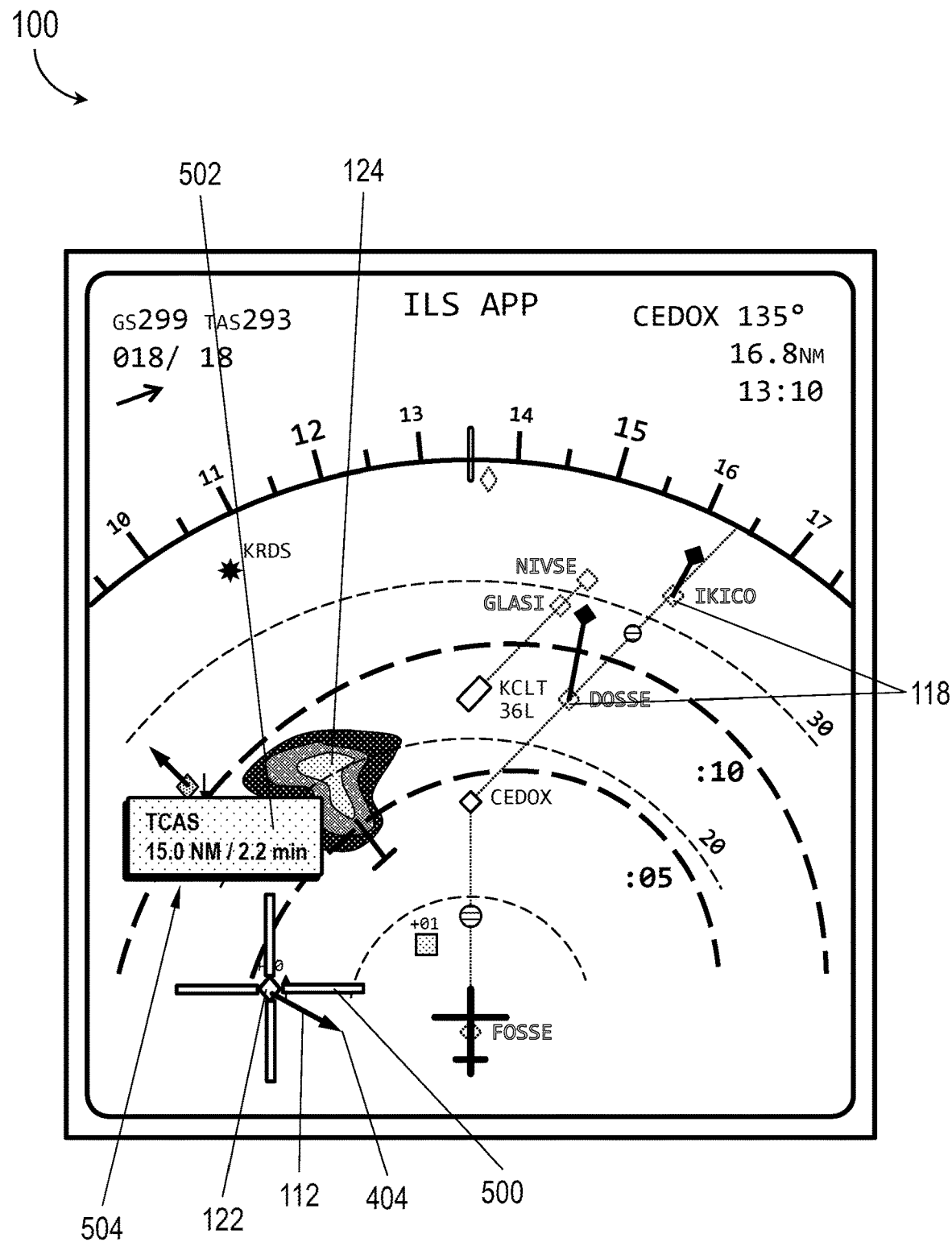
FIG. 5 is an illustration of the flight display system of FIG. 1 showing selective reporting operations.

Referring now to FIG. 5, the moving map 100 is shown.

In embodiments, the moving map 100 may include a cursor 500 configured for selection of time-displaced objects (e.g., waypoints 118, proximate aircraft 122, weather systems 124) for "tool tip" display of time-based ranging information 502. For example, a pilot or operator may select a time-displaced object (e.g., aircraft 122) via the cursor 500. When the aircraft 122 is "highlighted" by the cursor 500, time-based ranging information 502 corresponding to the aircraft 122 (and optionally, e.g., distance-based ranging information (108, FIG. 1)) may be displayed in a dialog box 504. For example, the distance-based ranging information may indicate the aircraft 122 at a distance of 15.0 NM from the ownship, and project the aircraft 122 at a time-displaced contact with the aircraft 300 (corresponding to the terminator 404 of the time-displacement vector 112) in approximately 2.2 minutes (2:12).

In embodiments, the cursor 500 may be moved (e.g., via control input provided via controls 310, FIG. 3) throughout the moving map 100. Alternatively, the cursor 500 may be toggled through a sequence of time-displaced objects (e.g., reflective of any time-displaced waypoints 118, proximate aircraft 122, and weather systems 124 known to the flight display system (302, FIG. 3)). For example, the cursor 500 may be used to highlight the weather system 124 and display, via dialog box 504, time-based ranging information projecting a time-displaced contact of the aircraft 300 with the weather system according to its time-displacement vector 112.

Figure 6:
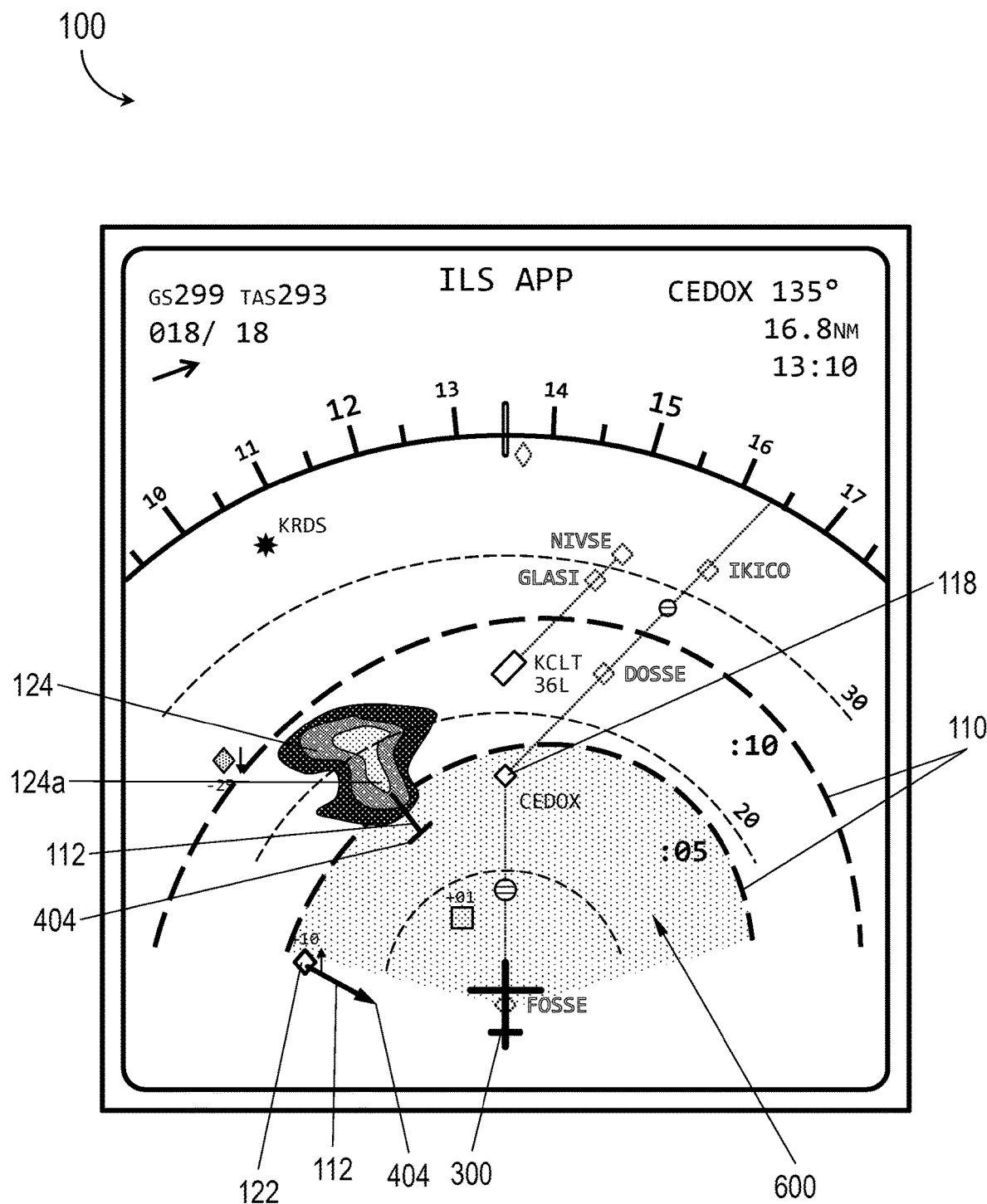
FIG. 6 is an illustration of the flight display system of FIG. 1 showing proximity zone operations.

Referring to FIG. 6, the moving map 100 is shown.

In embodiments, the subsequent time associated with time-based ranging 110 may (e.g., as selected by the pilot or operator, via the flight display system (302, FIG. 3) or controls (314, FIG. 3)) correspond to a time-domain proximity range 600 (e.g., proximity zone) surrounding the aircraft 300. For example, the moving map 100 may display time-based ranging 110 based on a subsequent time of +5 minutes (as well as additional time-based ranging corresponding to a subsequent time of +10 minutes). In embodiments, the moving map 100 may display time-displacement vectors 112 associated with any time-displaced objects (e.g., waypoints 118, aircraft 122, core elements 124a of weather systems 124) corresponding to a time-displaced contact (terminators 404) within the time-domain proximity range 600 (e.g., corresponding to a time-displaced contact within 5 minutes of the current time). For example, the moving map 100 may suppress display of time-displacement vectors 112 associated with any time-displaced objects whose time-displaced contacts lie outside the time-domain proximity range 600.

Figure 7A:
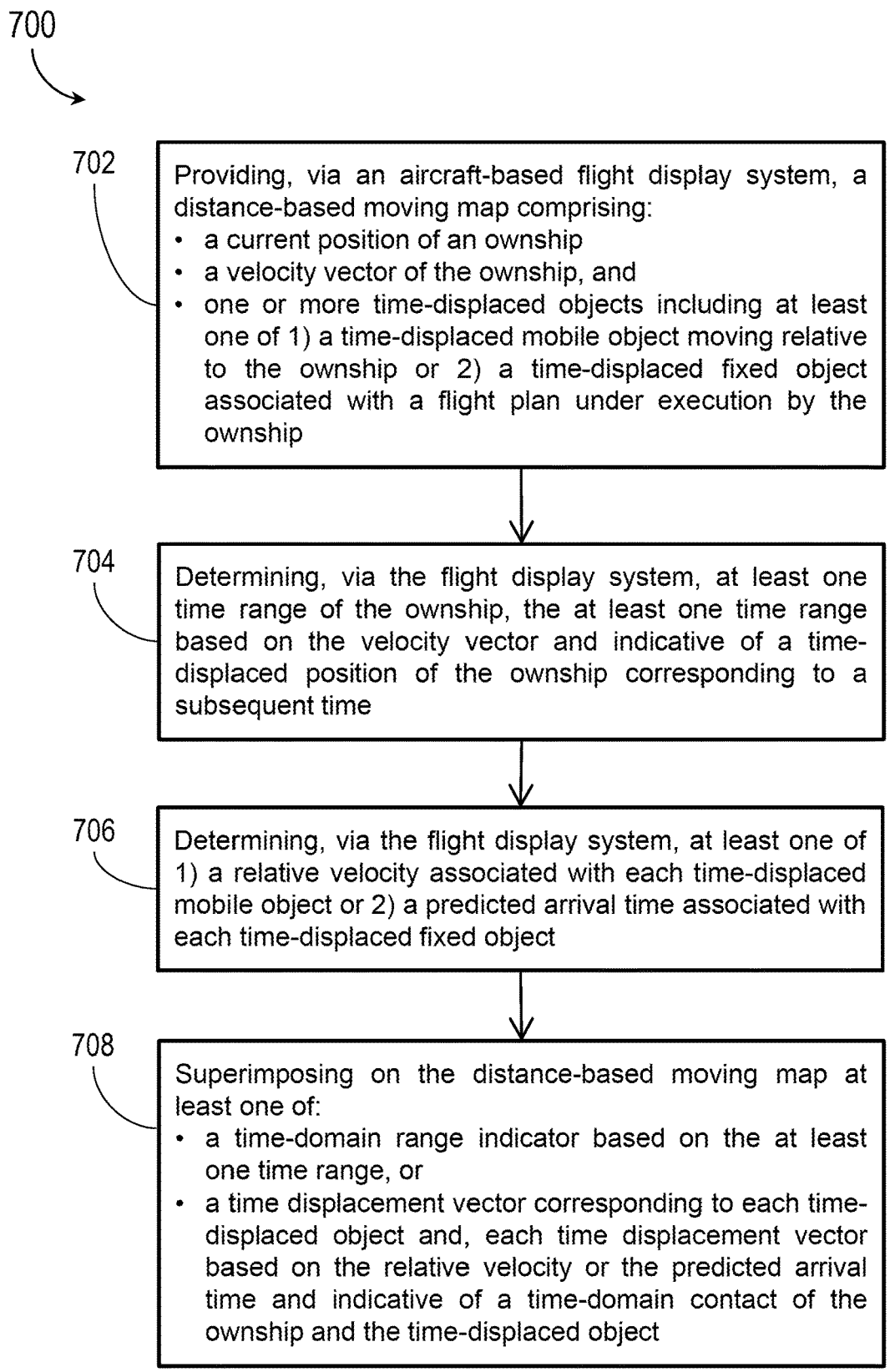
FIGS. 7A and 7B are flow diagrams illustrating a method for providing dynamic time-based overlays for positional maps according to example embodiments of this disclosure.

Referring now to FIG. 7A, the method 700 may be implemented by the moving map 100 and may include the following steps.

At a step 702, an aircraft-based flight display system (e.g., physically embodied aboard an ownship or incorporated into a simulation thereof) provides a distance-based moving map including a current position of the ownship, a velocity vector of the ownship (e.g., airspeed and heading information) and time-displaced objects proximate to the ownship and/or provided for by the aircraft flight plan. For example, time-displaced objects may include mobile objects, e.g., proximate aircraft and/or weather systems whose position information is reported to the ownship or relayed by traffic, surveillance, and/or weather radar systems. Time-displaced objects may also include fixed objects, e.g., ground-based waypoints included in the aircraft the flight plan.

At a step 704, the flight display system projects one or more time ranges of the ownship, each time range corresponding to a set of time-displaced positions of the ownship at a subsequent time given its current position and velocity vector. For example, time ranges may correspond to a selected subsequent time and/or multiples thereof (or, in some embodiments, a scaled-up or scaled-down time range corresponding to a resized moving map).

At a step 706, the flight display system determines relative velocities between the ownship and time-displaced mobile objects (e.g., aircraft and weather systems) and/or predicted contact times with time-displaced fixed objects, e.g., overflight times predicted by the aircraft flight plan.

At a step 708, the flight display system superimposes on the moving map time-based ranging information corresponding to the range of future positions of the ownship. In some embodiments, the display processors may superimpose time-displacement vectors corresponding to positions of air traffic, weather systems, and other time-displaced mobile objects of which relative velocities can be determined, projected forward in the time domain. For example, time-displacement vectors may include terminators indicative of a time-displaced contact with the ownship (e.g., overflight of waypoints, collision with aircraft or weather systems).

Figure 7B:
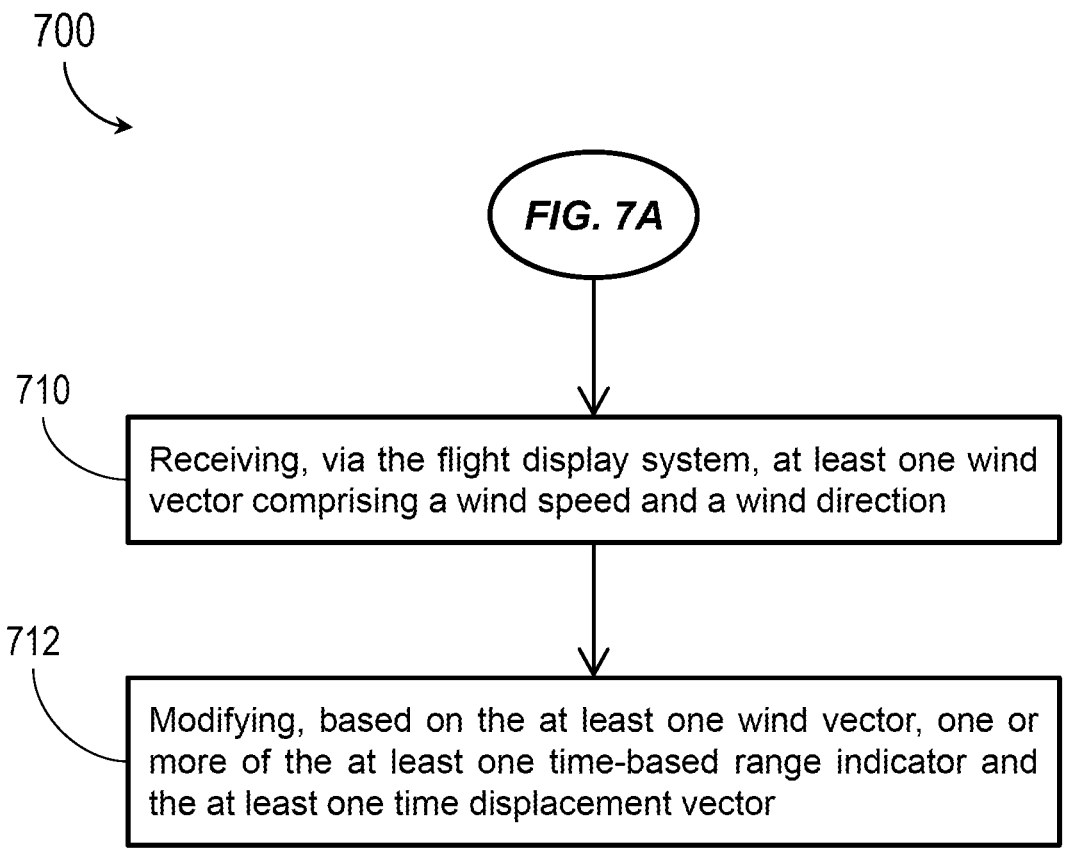

Referring also to FIG. 7B, the method may include additional steps 710 and 712. At the step 710, the flight display system receives wind vector information indicative of a wind speed and wind direction (e.g., wind patterns proximate to the ownship or directly in its flight path).

At the step 712, the flight display system may modify time-based ranging based on wind vector information to reflect the change in potential time range of the aircraft into a headwind or with a tailwind.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A flight display system for providing time-based overlays for a positional map display, the flight display system comprising:
  one or more graphics processors coupled to controlling avionics of an aircraft, the controlling avionics including a memory configured for storage of a flight plan under execution by the aircraft;
  at least one display unit configured for display of a distance-based moving map comprising:
    a current position of the aircraft at a current time;
    a velocity vector of the aircraft; and
    one or more time-displaced objects including at least one of:
    a time-displaced mobile object traveling relative to the aircraft;
    or
    a time-displaced fixed object associated with the flight plan;
  wherein the flight display system is configured to:
    determine at least one time range of the aircraft based on the velocity vector, each time range indicative of a time-displaced position of the aircraft at a subsequent time;
    determine a relative velocity associated with each time-displaced mobile object;
    determine a predicted arrival time associated with each time-displaced fixed object;
    and
    superimpose on the distance-based moving map;

a time-domain range indicator based on the at least one time range; and
a time-displacement vector corresponding to each time-displaced object and indicative of a time-displaced contact of the aircraft and the time-displaced object, the time-displacement vector based on the relative velocity or the predicted arrival time, the time-displacement vector including a terminator corresponding to the time-displaced contact and indicative of a type of the time-displaced object.

2. The flight display system of claim 1, wherein the time-domain range indicator includes:
a first time-domain range indicator corresponding to the subsequent time; and
at least one second time-domain range indicator corresponding to a multiple of the subsequent time.

3. The flight display system of claim 1, wherein the flight display system is configured to:
receive from the controlling avionics at least one wind vector comprising a wind speed and a wind direction; and
modify one or more of the time-based range indicator or the time-displacement vector based on the at least one wind vector.

4. The flight display system of claim 1, further comprising:
at least one control configured to receive control input from an operator;
wherein
the flight display system is configured to increase or decrease the subsequent time based on the control input.

5. The flight display system of claim 4, wherein the at least one control is selected from a group including:
a rotatable control configured for increasing the subsequent time when rotated in a first direction and for decreasing the subsequent time when rotated in a second direction;
and
at least one button configured for increasing or decreasing the subsequent time when engaged by the operator.

6. The flight display system of claim 1, wherein each time-displacement vector is orthogonal to the at least one time-based range indicator.

7. The flight display system of claim 1, wherein the aircraft is a first aircraft and the at least one time-displaced mobile object includes at least one second aircraft proximate to the first aircraft, the flight display system configured to receive via the controlling avionics at least one traffic report indicative of the relative velocity of the second aircraft.

8. The flight display system of claim 1, wherein the at least one time-displaced mobile object includes at least one weather system, the flight display system configured to receive via the controlling avionics at least one weather report indicative of the relative velocity of the weather system.

9. The flight display system of claim 1, wherein the at least one time-displaced fixed object includes at least one ground-based waypoint, the flight display system configured to receive via the controlling avionics the at least one predicted arrival time associated with the flight plan, the predicted arrival time indicative of the time-displaced contact.

10. The flight display system of claim 1, further comprising:

at least one cursor adjustable by the operator and configured to highlight the at least one time-displaced object;
wherein the flight display system is configured to display a numeric time range corresponding to the time-displaced contact.

11. The flight display system of claim 1, wherein:
the subsequent time is indicative of a time-domain proximity zone surrounding the aircraft;
and wherein
the flight display system is configured to superimpose on the distance-based moving map a time-displacement vector corresponding to each time-displaced object associated with a time-displaced contact inside the time-domain proximity zone.

12. A method for providing time-based overlays for positional maps, the method comprising:
providing, via an aircraft-based flight display system, a distance-based moving map comprising:
a current position of an ownship;
a velocity vector of the ownship;
and
one or more time-displaced objects including at least one of
1) a time-displaced mobile object moving relative to the ownship or
2) a time-displaced fixed object associated with a flight plan under execution by the ownship;
determining, via the flight display system, at least one time range of the ownship, the at least one time range based on the velocity vector and indicative of a time-displaced position of the ownship corresponding to a subsequent time;
determining, via the flight display system, at least one of 1) a relative velocity associated with each time-displaced mobile object or 2) a predicted arrival time associated with each time-displaced fixed object;
and
superimposing on the distance-based moving map:
a time-domain range indicator based on the at least one time range;
and
a time-displacement vector corresponding to each time-displaced object, each time-displacement vector based on the relative velocity or the predicted arrival time and including a terminator indicative 1) of a time-displaced contact of the ownship and the time-displaced object and 2) of a type of the time-displaced object.

13. The method of claim 12, further comprising:
receiving, via the flight display system, at least one wind vector comprising a wind speed and a wind direction; and
modifying, based on the at least one wind vector, one or more of the at least one time-based range indicator and the at least one time-displacement vector.

14. The method of claim 12, wherein superimposing on the distance-based moving map at least one of a time-domain range indicator based on the at least one time range or a time-displacement vector corresponding to each time-displaced object includes:
superimposing on the distance-based moving map a time-displacement vector corresponding to each time-displaced object associated with a time-displaced contact inside the time-domain proximity zone.

* * * * *